(12) United States Patent
Cohen (10) Patent No.: US 7,735,758 B2
(45) Date of Patent: Jun. 15, 2010

(54) DRIP IRRIGATION HOSES OF THE LABYRINTH TYPE AND FLOW-CONTROL ELEMENTS FOR PRODUCING SUCH HOSES

(76) Inventor: Amir Cohen, Yuvalim, Doar Na Misgav (IL) 20142

( * ) Notice: Subject to any disclaimer, the term of this patent is extended or adjusted under 35 U.S.C. 154(b) by 372 days.

(21) Appl. No.: 11/522,445

(22) Filed: Sep. 18, 2006

(65) Prior Publication Data

US 2008/0067266 A1 Mar. 20, 2008

(51) Int. Cl.
*B05B 15/00* (2006.01)
(52) U.S. Cl. .................... 239/542; 239/547; 239/533.1; 239/533.13
(58) Field of Classification Search .................. 239/542, 239/547, 533.1, 533.13
See application file for complete search history.

(56) References Cited

U.S. PATENT DOCUMENTS

| | | | |
|---|---|---|---|
| 4,430,020 A | 2/1984 | Robbins | |
| 5,207,386 A | * 5/1993 | Mehoudar | 239/542 |
| 5,333,793 A | 8/1994 | DeFrank | |
| 5,615,838 A | 4/1997 | Eckstein et al. | |
| 5,636,797 A | * 6/1997 | Cohen | 239/542 |
| 5,829,685 A | 11/1998 | Cohen | |
| 6,371,390 B1 | * 4/2002 | Cohen | 239/542 |
| 6,382,530 B1 | 5/2002 | Perkins | |
| 6,736,337 B2 | 5/2004 | Vildibill et al. | |
| 6,817,548 B2 | * 11/2004 | Krauth | 239/542 |
| 2003/0150940 A1 | 8/2003 | Vildibill et al. | |

FOREIGN PATENT DOCUMENTS

| | | |
|---|---|---|
| WO | WO/98/10625 | 3/1998 |
| WO | WO/98/10635 | 3/1998 |
| WO | WO 2008/035335 | 3/2008 |

OTHER PUBLICATIONS

International Search Report Dated Jun. 4, 2008 From the International Searching Authority Re.: Application No. PCT/IL07/01146.
Written Opinion Dated Jun. 4, 2008 From the International Searching Authority Re.: Application No. PCT/IL07/01146.
International Preliminary Report on Patentability Dated Apr. 2, 2009 From the International Bureau of WIPO Re.: Application No. PCT/IL2007/001146.

* cited by examiner

*Primary Examiner*—Dinh Q Nguyen (57) ABSTRACT

A drip irrigation hose includes a tube for conducting pressurized water through its interior and formed with a plurality of outlets for emitting water at longitudinally-spaced locations along the length of the tube; and a plurality of flow-control elements fixed with respect to the inner surface of the tube at longitudinally-spaced locations thereof to define, with the inner surface, a plurality of labyrinths each having an inlet communicating with the interior of the tube and an outlet communicating with a tube outlet for emitting water there from at a slow rate. The labyrinth includes a bottom wall constructed to produce, adjacent to the bottom wall, a significant laminar flow of water in which the laminar flow decreases, and thereby turbulent flow increases, with an increase in the water pressure within the tube to thereby provide pressure-compensation for the water flow through the respective tube outlet.

44 Claims, 7 Drawing Sheets

DRIP IRRIGATION HOSES OF THE LABYRINTH TYPE AND FLOW-CONTROL ELEMENTS FOR PRODUCING SUCH HOSES

FIELD AND BACKGROUND OF THE INVENTION

The present invention relates to drip irrigation devices, and particularly to drip irrigation hoses used for discharging the irrigation water at slow rates from a plurality of longitudinally-spaced locations along the length of the hose. The invention also relates to flow-control elements for producing such hoses.

Drip irrigation hoses are increasingly being used for irrigating various types of plants since, among other advantages; they supply the water directly to the root regions of the plants and are therefore highly conservative of water and fertilizer. One type of drip irrigation hose includes a tube for conducting pressurized water through its interior and formed with a plurality of tube outlets for discharging the water at longitudinally-spaced locations along its length, and a plurality of flow-control elements fixed with respect to the inner surface of the tube to define a plurality of labyrinths, each having an inlet at one end communicating with the interior of the tube and an outlet at the opposite end communicating with the tube outlet for discharging water there from at a slow rate.

One problem in using drip irrigation hoses is the difficulty in ensuring relatively uniform discharge rates along the length of the hose. This problem is particularly acute where extremely long lengths of the hose are used since the hose itself produces a pressure drop along its length tending to decrease the discharge rate at the end of the hose. This sensitivity of discharge rate to the water pressure is also a problem where the land being irrigated is not flat and even.

Another problem with such drip irrigation hoses is sensitivity to clogging, and the difficulty in removing clogging particles.

In addition, such drip irrigation hoses are frequently used for only a single season, or for relatively few seasons; and accordingly the cost involved in producing such drip irrigation is a significant factor in their use.

Examples of how these problems have been addressed in the prior art are described in U.S. Pat. Nos. 5,333,793, 5,829,685, 5,615,838 and 6,736,337; in Publication No. US2003/0150940A1, published Aug. 14, 2003; and in International Patent Applications PCT/IL/97/00298 (International Publication No. WO/98/10625), PCT/IL01/00751 and PCT/IL02/00953. However, efforts are continually being made to improve the construction of such drip irrigation hoses with respect to one or more of the above problems.

OBJECTS AND BRIEF SUMMARY OF THE PRESENT INVENTION

An object of the present invention is to provide a drip irrigation hose having advantages in one or more of the above respects. Another object of the present invention is to provide a flow-control element, and a continuous strip of such elements, for fixing with respect to the inner surface of a tube, in order to provide a drip-irrigation hose having advantages in one or more of the above respects.

According to one aspect of the present invention, there is provided a drip irrigation hose, comprising: a tube for conducting pressurized water through its interior and formed with a plurality of outlets for emitting water at longitudinally-spaced locations along the length of the tube; and a plurality of flow-control elements fixed with respect to the inner surface of the tube at longitudinally-spaced locations thereof to define, with the inner surface, a plurality of labyrinths each having an inlet communicating with the interior of the tube and an outlet communicating with a tube outlet for emitting water there from at a slow rate. The labyrinth includes a bottom wall of an elastomeric material constructed to produce, adjacent to the bottom wall, a significant laminar flow of water in which the laminar flow decreases, and thereby turbulent flow increases, with an increase in the water pressure within the tube to thereby provide pressure-compensation for the water flow through the respective tube outlet.

According to further features in the described preferred embodiments, the labyrinth further includes a plurality of teeth in spaced, staggered relationship to each other; at least some of said teeth being constructed with an expanded root where joined to the bottom wall to produce significant laminar flow adjacent to said bottom wall; said bottom wall being dimensioned such that an increase in said water pressure deforms the bottom wall in a manner to decrease the laminar flow through said labyrinth and thereby to increase the pressure drop through the respective portion of said labyrinth.

More particularly, in the described preferred embodiments, the teeth including said expanded roots are joined to said bottom wall by a juncture formed with a curve or an obtuse angle with respect to said bottom wall, such that said juncture tends to increase the laminar flow adjacent to the bottom wall, but said water pressure applied to said bottom wall tends to deform said juncture to decrease the laminar flow adjacent to said bottom wall, and thereby to increase the turbulent flow through said labyrinth.

According to still further features in the described preferred embodiments, the teeth are formed at spaced locations in a pair of spaced side walls; and the portions of each side wall between its respective teeth are also joined to said bottom wall by junctures formed with a curve or an obtuse angle with respect to said bottom wall.

The foregoing manner of providing pressure-compensation is to be sharply distinguished from my U.S. Pat. No. 5,829,685 and International Publication No. WO 98/10635, both cited above. Thus, in my U.S. Pat. No. 5,829,685, pressure compensation is provided by changing the width and/or depth of recesses straddling the labyrinth; whereas in International Publication No. WO 98/10635 pressure compensation is provided by varying the height of the baffles defining the labyrinth. According to some embodiments of the present invention, pressured compensation is provided by including, in the labyrinth, a bottom wall constructed such that the turbulent flow through the labyrinth is gradually changed along the length of the labyrinth by changes in the water pressure within the tube. Briefly, this is done by including, in each labyrinth, a bottom wall and teeth having, adjacent to the bottom wall, expanded roots whose shape changes with an increase in pressure within the tube to increase turbulent flow trough the labyrinth. Thus, the labyrinth includes a bottom wall constructed such that its deformability to the water pressure within the tube decreases in the downstream direction.

Other embodiments are described wherein pressure compensation is provided by forming the labyrinth with a bottom wall having a continuous groove serving as a parallel flow path for the water flow through the labyrinth, the bottom wall of the labyrinth being deformable by an increase in the water pressure within the tube to decrease the flow through the continuous groove.

According to another aspect of the present invention, there is provided a drip irrigation hose, comprising a tube for conducting pressurized water through its interior, and formed with a plurality of tube outlets for discharging the water at longitudinally-spaced locations along the length of the tube; and a plurality of flow-control elements secured to the inner surface of said tube at longitudinally-spaced locations thereof to define, with said inner surface, a plurality of labyrinths, each having an inlet at one end communicating with the interior of the tube and an outlet at the opposite end communicating with a tube outlet for discharging water there from at a slow rate; the inlet of each labyrinth being defined by a plurality of spaced projections engageable with the inner surface of the tube to form a plurality of filtering inlet passageways for the water entering the respective labyrinth from the interior of the tube; the plurality of spaced projections being arrayed in an outer line and in an inner line in a staggered relationship with respect to those of the outer line; the projections of the outer line being of larger height and of decreasing thickness with increasing height. This feature is advantageous in reducing the possibility of clogging at the inlet ends of each labyrinth, and of removing clogging particles.

According to a still further aspect of this present invention, there is provided a flow-control element constructed to be fixed with respect to the inner face of a tube, comprising: a plastic strip shaped to define, with the inner surface of the tube, a labyrinth having an inlet communicating with the interior of the tube and an outlet downstream of the inlet communicating with a tube outlet for emitting water there from at a slow rate; said labyrinth including a bottom wall constructed to produce, adjacent to said bottom wall, a significant laminar flow of water in which the laminar flow decreases, and thereby turbulent flow increases, with an increase in the water pressure within the tube to thereby provide pressure-compensation for the water flow through the respective tube outlet.

As will be described more particularly below, the foregoing features provide drip-irrigation hoses with automatic pressure compensation in a manner which reduces the possibility of clogging, increases the possibility of removing clogging particles without shutting down the line, and also permits the drip irrigation hoses to be constructed in volume and at relatively low cost.

Further features and advantages of the invention will be apparent from the description below.

BRIEF DESCRIPTION OF THE DRAWINGS

The invention is herein described, by way of example only, with the reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

The Overall Construction

Figures 1, 2, 4:
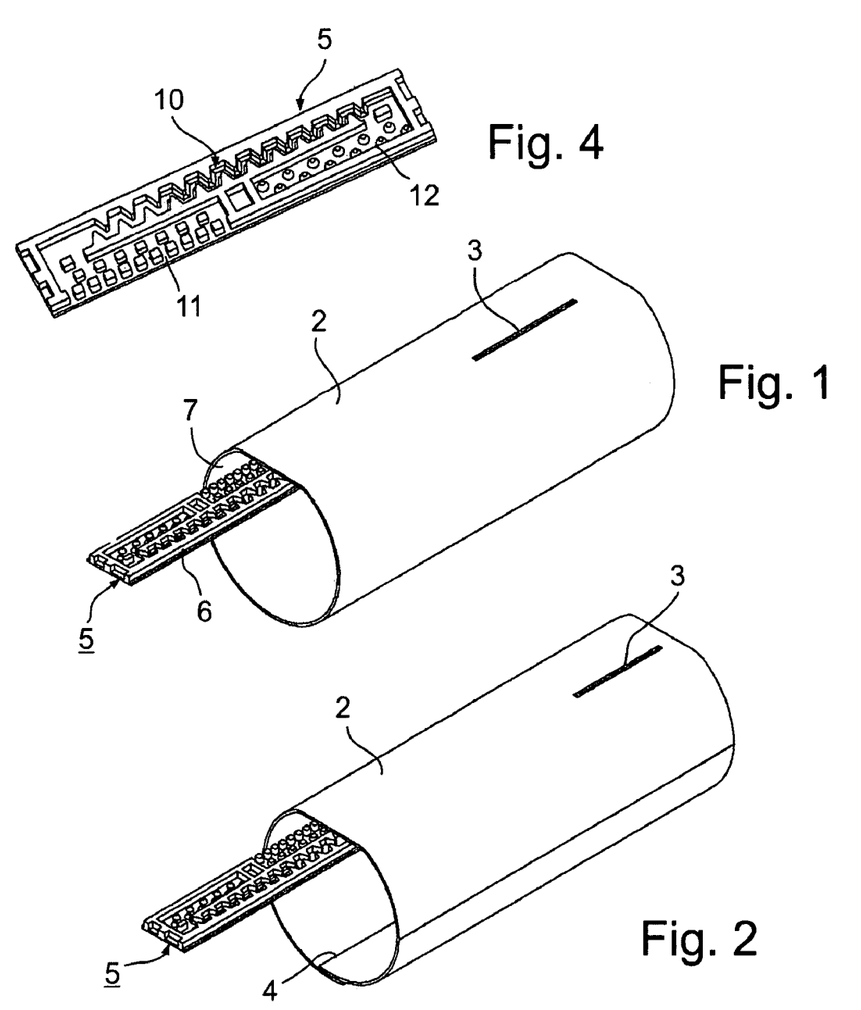
FIG. 1 illustrates a seamless-type (extruded) drip irrigation hose constructed in accordance with the present invention.
FIG. 2 illustrates a seamed-type drip irrigation hose constructed in accordance with the present invention.
FIG. 4 is an enlarged plan view of one flow-control element in the strip of FIG. 3.

As shown in FIGS. 1 and 2, the illustrated drip irrigation hose comprises a tube 2 for conducting pressurized water through its interior and formed with a plurality of tube outlets 3 (only one of which is shown) for discharging water at a slow rate at longitudinally-spaced locations along the length of the tube. FIG. 1 illustrates a seamless-type (extruded) tube; whereas FIG. 2 illustrates a seamed-type tube, including a seam 4.

Figure 3:
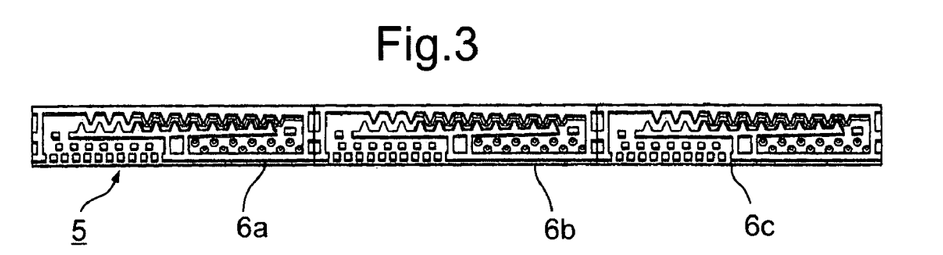
FIG. 3 illustrates the strip of flow-control elements secured to the inner surface of the tube of either FIG. 1 or 2.

The illustrated drip irrigation hose further comprises a continuous strip 5 formed with a plurality of flow-control elements 6a-6c be fixed with respect to the inner surface 7 of tube 2 at longitudinally-spaced locations thereof to define, with the inner surface of the tube, a plurality of labyrinths 10. Each labyrinth 10 has an inlet 11 at one end communicating with the interior of the tube, and an outlet 12 at the opposite end communicating with a tube outlet 3 for discharging water there from at a slow rate. FIG. 4 illustrates one such flow-control element 6. Its labyrinth 10 controls the flow of the water from its inlet 11 to its outlet 12, in response to the water pressure within the tube at the respective location of the flow-control element.

According to one broad aspect of the present invention, this is done by providing the labyrinth with a bottom wall constructed to produce, adjacent to the bottom wall, a significant laminar flow of water in which the laminar flow decreases, and thereby turbulent flow increases, with an increase water pressure within the tube to thereby provide pressure-compensation for the water flow through the respective tube outlet.

In some embodiments, the labyrinth includes a bottom wall constructed such that a turbulent flow through the labyrinth is gradually changed along the length of the labyrinth by changes in the water pressure within the tube. In other described embodiments, the labyrinth includes a bottom wall and teeth having, adjacent to the bottom wall, expanded roots whose shape changes with an increase in pressure within the tube to increase turbulent flow through the labyrinth. In still other described embodiments, the labyrinth is formed with a bottom wall having a continuous groove serving as a parallel flow path for the water flow through the labyrinth, the bottom wall being deformable by an increase in the water pressure within the tube to decrease the flow through the continuous groove. In some of the described embodiments, the labyrinth includes a bottom wall constructed such that its deformability to the water pressure within the tube decreases in the downstream direction.

The Embodiment of FIGS. 1-10

In this embodiment, the pressure-compensation is produced by constructing the labyrinth with teeth having an expanded root where joined to the bottom wall to produce significant laminar flow adjacent to the bottom wall. The expanded roots are formed by a joining each such tooth to the bottom wall by a juncture formed with a curve or an obtuse angle with respect to the bottom wall. Such a juncture thus increases the laminar flow adjacent to the bottom wall since it produces a more gradual transition between the bottom wall and the tooth. However, when the water pressure within the tube is applied to the bottom wall, such water pressure deforms the bottom wall in the direction to make this transition between the tooth and the bottom wall more abrupt, thereby decreasing the laminar flow adjacent to the bottom wall and increasing the turbulent flow through the labyrinth, which increased turbulent flow produces the pressure-compensation.

In the embodiment of the invention illustrated in FIGS. 1-10, the transverse dimension of the labyrinth is not constant, but rather decreases in width in the downstream direction. As a result, the width of the bottom wall is decrease in this downstream direction. Since the deformability of the bottom wall is directly related to its width, it will be seen that this feature decreases the pressure-sensitivity in the downstream direction. Since the delta-pressure is highest at the outlet, this feature reduces the possibility of clogging by excessively high pressure, and also increases the possibility of releasing clogging particles when the high pressure drops.

Figures 5, 6A, 6B, 6C:
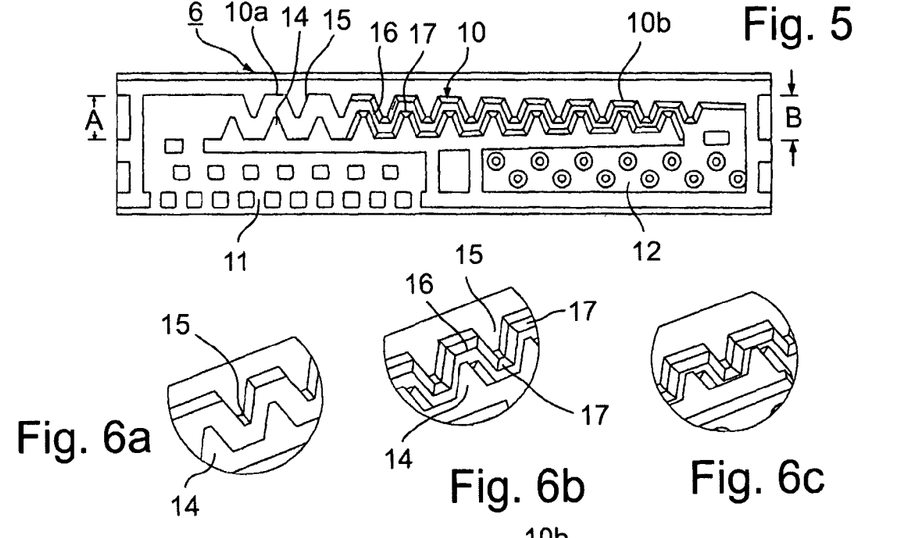
FIG. 5 illustrates more clearly the construction of the flow-control element of FIG. 4.
FIGS. 6a-6e are enlarged fragmentary views of the encircled regions in FIG. 6.

Thus, as seen particularly in FIG. 5, the width of the labyrinth 10 decreases in transverse dimension from its inlet end 11, indicated at A, to its outlet end 12, indicated at B; that is A>B.

Figures 6, 6D, 6E, 7, 7A, 7B:
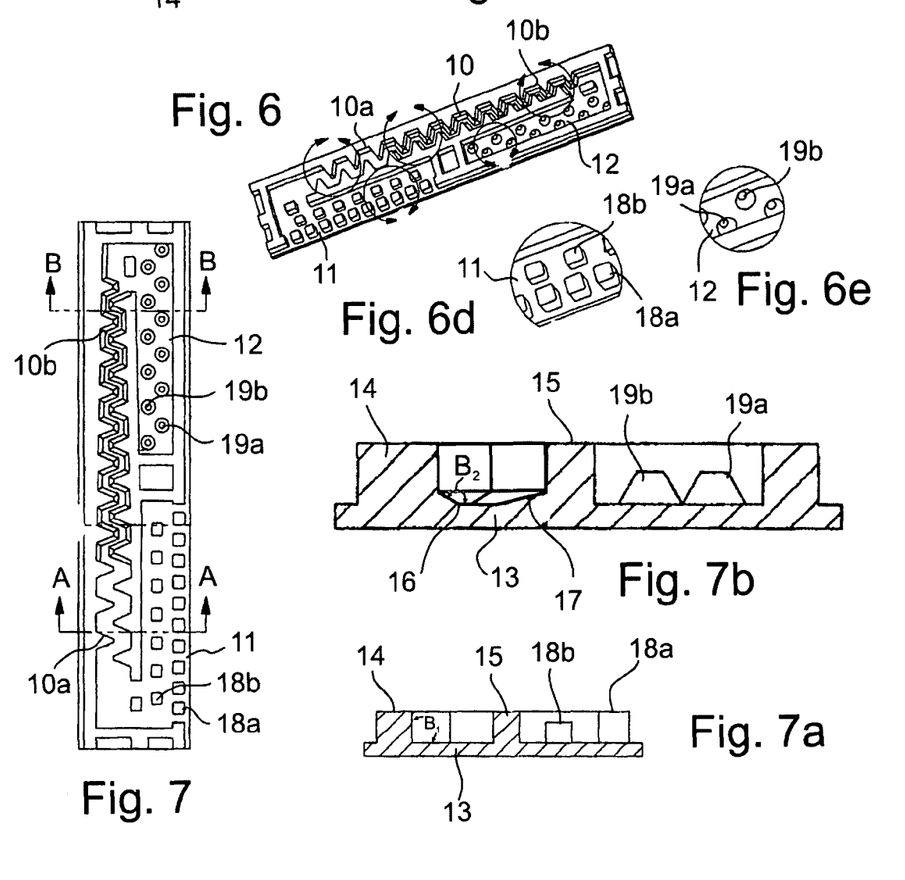
FIG. 6 is an isometric view of the flow-control element of FIG. 5.
FIG. 7 further illustrates the construction of the flow-control element of FIG. 4.
FIGS. 7a and 7b are sectional views along the section lines of FIG. 7.

Also, as shown in the sectional views of FIGS. 7a and 7b, labyrinth 10 is defined by a bottom wall 13 and a pair of side walls formed with spaced teeth 14,15 straddling the bottom wall and engageable with the inner surface 7 of tube 2 when the flow-control element 6 is fixed with respect to it. Teeth 14, 15 are formed in the side walls in a spaced, staggered relationship to each other to define the respective labyrinth passageway.

As shown in FIG. 7, labyrinth 10 includes a section 10a at the inlet end, and another section 10b at the outlet end. Section 10a of the labyrinth serves mostly to reduce the pressure of the incoming water, whereas section 10b serves mostly to produce pressure-compensation in the water emitted from the outlet 12, to compensate for the water pressure at this location of the flow-control element 6 in the tube 2. For this purpose, the teeth 14,15 within labyrinth section 10b are constructed with an expanded root 16,17, as shown particularly in FIGS. 6b, 6c and 7b where joined to the bottom wall 13, which produces a more gradual transition between the bottom wall and its adjacent side wall, and thereby produces more laminar flow adjacent to the bottom wall.

FIG. 7a illustrates a section through the inlet end 10 of labyrinth 10 wherein it will be seen that the roots of the teeth 14,15 are substantially 90° to the bottom wall 13 (i.e., $\beta_1=90°$). Such an abrupt juncture of these walls creates substantial turbulence in this part of the passageway.

FIG. 7b illustrates a section through the outlet end 10b of labyrinth 10, wherein the roots of the teeth 14, 15 are expanded, as shown at 16, 17, at their junctures with the bottom wall 13. As show particularly in FIG. 7b, the junctures of the expanded roots define an angle larger than 90° with respect to the bottom wall 13; that is, $\beta_2$ is an obtuse angle. These junctures may also be gradually-curved junctures. In either event an obtuse angle or gradually-curved juncture produces a more gradual transition between the bottom wall 13 and the teeth 14, 15, which thereby produces a significant laminar flow adjacent to the bottom wall at this location of the labyrinth.

Accordingly, the turbulence will be greater through labyrinth section 10a, to thereby produce a greater pressure drop, whereas there will be a significant laminar flow through labyrinth section 14b, thereby producing a low pressure drop in that section. Pressure compensation is effected primarily in labyrinth section 10b, wherein the teeth 14, 15 are provided with the expanded roots 16, 17 having curved or obtuse-angle junctures with the bottom wall 13. This is because the bottom wall 13 in this section of the labyrinth changes its shape to decrease the laminar flow, and thereby increase the turbulent flow, in response to pressure. In addition, the cross-section of the passageway is decreased.

In the embodiment illustrated in FIGS. 1-10, the obtuse angle of the juncture between the bottom wall 13 and the expanded roots 16, 17 of the teeth is constant throughout labyrinth section 10b. However, this angle could gradually increase in the downstream direction, as described more particularly below with respect to the embodiments of FIGS. 11 and 12. In addition, in the embodiment of FIG. 1-10, the curved or obtuse angle juncture of the bottom wall 13 with the expanded roots 16, 17 of the teeth 14, 15 extends for the complete length of the side walls, that is, also in the spaces between the teeth. In some applications, however, such a curved or obtuse-angle juncture can be provided only in this expanded root of the teeth.

As indicated earlier, the pressure-compensation is affected by deforming the bottom wall 13 by the pressure of the water, at the respective location, toward the inner surface of the tube. Thus, a large pressure at that location will produce a large deformation of bottom wall 13, to bring angle β closer to 90°. This decreases the laminar flow adjacent the bottom wall, and increases the turbulences, and thereby the pressure drop caused by such deformation.

Since the deformability of the bottom wall increases with the increase in the surface area of the bottom wall, and since A>B in the construction illustrated in FIG. 1-10, it will be seen that the pressure sensitivity in the construction illustrated in FIGS. 1-10, produced by the deformation of the bottom wall, decreases towards the outlet 12 of the respective labyrinth 10. Thus reduces the possibility of clogging even under high pressure conditions.

The deformation of the bottom wall 13 of the labyrinth 10, according to the pressure at the respective location in the tube, also changes the effective length of the turbulent portion of the labyrinth, to produce the pressure-compensation. This is shown particularly in FIGS. 8-10, wherein FIG. 8 illustrates the condition of the labyrinth 10 under low-pressure conditions, FIG. 9 under medium-pressure conditions, and FIG. 10 under high-pressure conditions.

Figures 8, 8A, 8B, 8C:
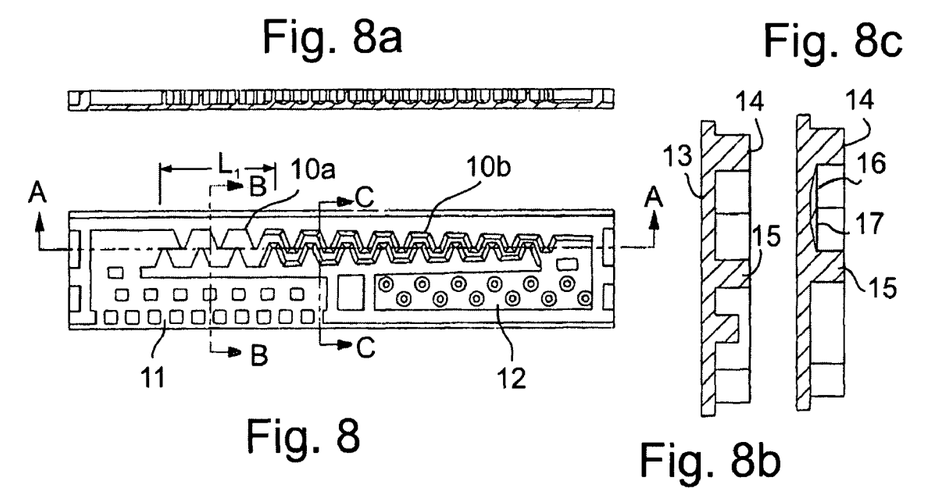
FIG. 8 illustrates the flow-control element of FIG. 4 under low-pressure conditions.
FIGS. 8a-8c are sections along the section lines of FIG. 8.

Thus, as shown in FIG. 8 illustrating a low-pressure condition, the effective length ($L_1$) of the turbulent section is only the length of the labyrinth section 10a provided with conventional teeth 14,15, i.e., not with the expanded roots 16,17 (FIG. 7a). Under the medium-pressure condition illustrated in FIG. 9, the deformation of the bottom wall of the labyrinth is effective, not only to restrict the passageway as shown in FIG. 9b, but also to increase the effective length of the turbulent section to $L_2$, so that it includes a part of the outlet section 10b formed with teeth having expanded roots (FIG. 7b). Under the high-pressure condition illustrated in FIG. 10, the effective length of the turbulent passageway is further increased to $L_3$, namely to include most of the pressure-sensitive section 10b, thereby further increasing the pressure-drop through the passageway to compensate for the higher pressure at that location of the tube.

FIGS. 6, 6d and 6e further illustrate the constructions of inlet 11 and outlet 12, respectively, of each flow control element including in the labyrinth 10. Such constructions reduces the possibility of clogging by a high pressure. It also increases the chances of freeing the clogging particles upon a drop in the high pressure.

Thus, as shown in FIG. 6d, inlet 11 of each labyrinth 10 is defined by a plurality of spaced projections 18a, 18b engageable with the inner surface of the tube 2 to form inlet passageways for the water. The plurality of spaced projections are arrayed in two lines, defining an outer line 18a, and an inner line 18b in a staggered relationship with respect to those of the outer line. These projections are substantially rectangular in cross-section, and as shown in FIG. 7a the projections of the outer line 18a are of slightly larger height than those in the inner line 18b. Such a construction has been found to provide narrow filtering inlet passageways with reduced possibility of clogging, even under high water-pressure conditions.

The construction at the outlet end 12 of each labyrinth 10, as seen in FIGS. 6e and 7b also includes two lines of projections 19a, 19b in staggered relationship to each other. In this case, however, the projections are of generally conical configuration and are of substantially the same height. Projections 19a, 19b are thus engageable with the inner surface of the tube to form outlet passageways for water exiting from the respective labyrinth, but because the delta-pressure at the outlet end is very high, the danger of clogging is reduced.

As indicated above, in the drip irrigation hose illustrated in FIGS. 1-10, the effective width (i.e., transverse dimension A, B) of each labyrinth 10 decreases uniformly from its inlet end 11 to its outlet end 12. This is shown particularly in FIG. 5, wherein the effective width is indicated as "A" at the inlet end, and as "B" at the outlet end. Preferably, width "A" is within the range of 2.0-3.0 mm, more preferably about 2.5 mm; whereas width "B" is within the range of 2.0-1.0 mm, more preferably about 1.5 mm.

Figure 9:
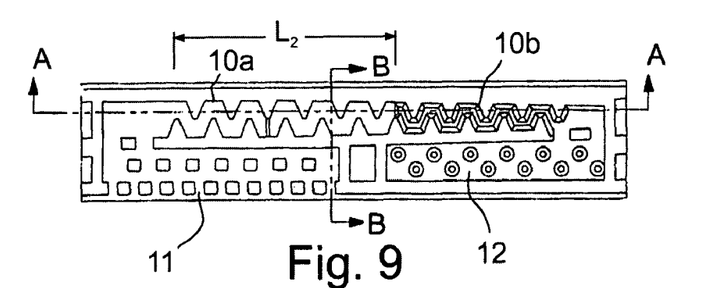
FIG. 9 illustrates the flow-control element under medium-pressure conditions.
Figure 9A:
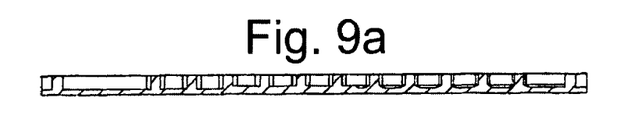
FIGS. 9a and 9b are sections along the section lines of FIG. 9.
Figure 9B:
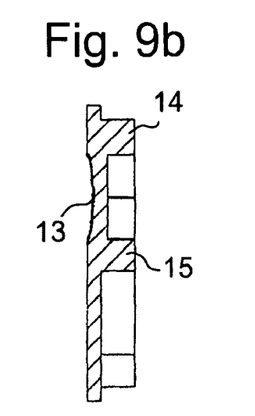
Figure 10:
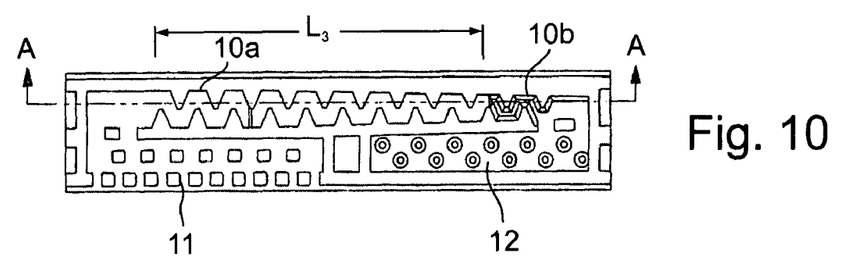
FIG. 10 illustrates the flow-control element under high-pressure conditions.

The operation of the illustrated drip irrigation hose will be apparent from the above description and from FIGS. 8-10 of the drawings.

Thus, FIGS. 8 and 8a-8c illustrate the labyrinth 10 during low-pressure conditions within the tube. During low-pressure conditions, the bottom wall 13 of labyrinth 10 (the surface exposed to the water pressure within the tube) is not significantly deformed, so that length L1 of the labyrinth section 10a, namely the section formed with conventional teeth 14, 15, as shown in FIG. 8b, is effective to produce turbulent flow.

FIGS. 9, and 9a-9c illustrate the labyrinth 10 under medium-pressure conditions within the tube, wherein it will be seen that the pressure within the tube deforms the inlet end of labyrinth 10, as shown in FIG. 9b, to thereby increase the effective length (to $L_2$) of this turbulent section, and decrease that of the laminar-flow section. In addition, the cross-section of the passageway is decreased. The effect is to increase the pressure drop to thereby compensate for the increased pressure in the tube.

Figure 10A:
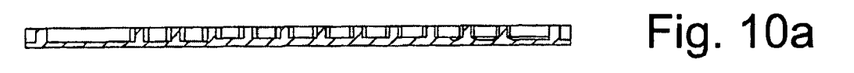
FIG. 10a is a section along the section line of FIG. 10.

FIGS. 10 and 10a illustrate the labyrinth during high-pressure conditions, wherein it will be seen that the high pressure further deforms the labyrinth 10 to further increase the effective length of the turbulent section 13b (to $L_3$), and to decrease that of the laminar-flow section. The effect is to further increase the pressure drop through the labyrinth and, thereby, to compensate for the increased pressure within the tube.

The Embodiment of FIGS. 11-13c

FIGS. 11-13c illustrate another embodiment of the invention in the form of a flow-control element including a labyrinth, generally designated 20, which is basically the same as labyrinth 10 described above with respect to FIGS. 1-10, except that the teeth 24, 25 in the outlet section 20b of the labyrinth includes expanded roots 26, 27 formed by junctures having increasing obtuse angles (β) in the downstream direction, rather than a constant obtuse angle as in FIGS. 1-10.

Figures 11, 11A, 11B, 12, 12A, 12B, 12C, 13A, 13B, 13C:
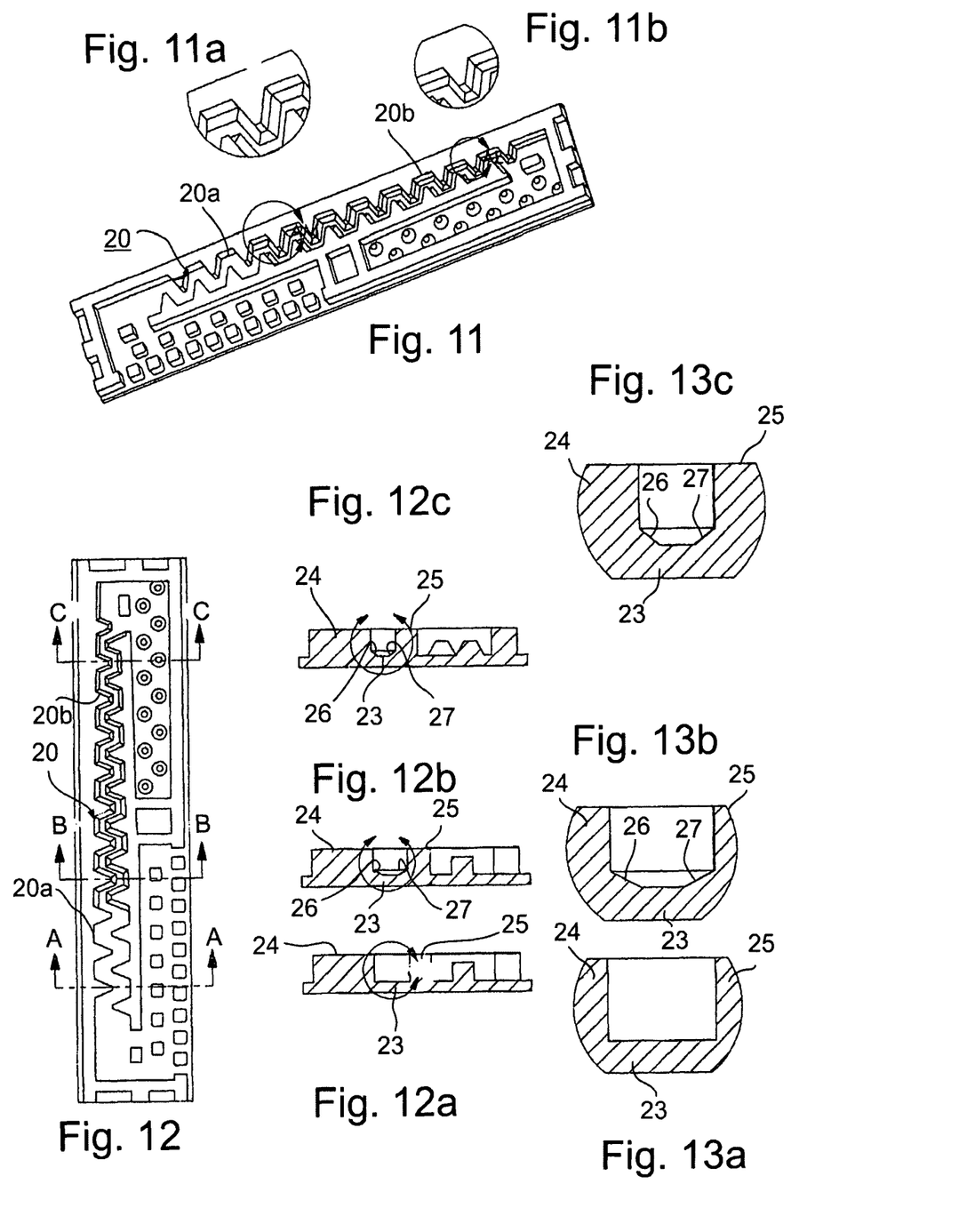
FIG. 11 illustrates a variation in the construction of the flow-control element of FIG. 4.
FIGS. 11a and 11b are enlarged fragmentary views of the two encircled regions of interest in FIG. 11.
FIG. 12 illustrates the flow-control element of FIG. 11.
FIGS. 12a-12c illustrate sections along the section lines of FIG. 12.
FIGS. 13a-13c are enlarged fragmentary views of the encircled regions of interest in FIGS. 12a-12c, respectively.

That is, in labyrinth 20 illustrated in these figures, the teeth 24,25 defuse a 90° angle with respect to the bottom wall 23 in the inlet section 20a of the labyrinth (FIG. 13a). Also, the teeth 24, 25 in the outlet section 20b of the labyrinth are formed with expanded roots 26, 27 defining an obtuse angle (over 90°) with the bottom wall 23, but such an obtuse angle increases in the downstream direction, as shown in FIGS. 13b and 13c. This modification, therefore, is more effective than labyrinth 10 of FIGS. 1-10 in producing the pressure compensation, and also in reducing the possibility of clogging at high pressures, as well as increasing the possibility of releasing clogging particles when the high-pressure drops.

In all other respects, the flow-control element including labyrinth 20 illustrated in FIGS. 11-13b is constructed, and provides the advantages, as the flow-control element including labyrinth 10 illustrated in FIGS. 1-10 as described above.

Figure 14:
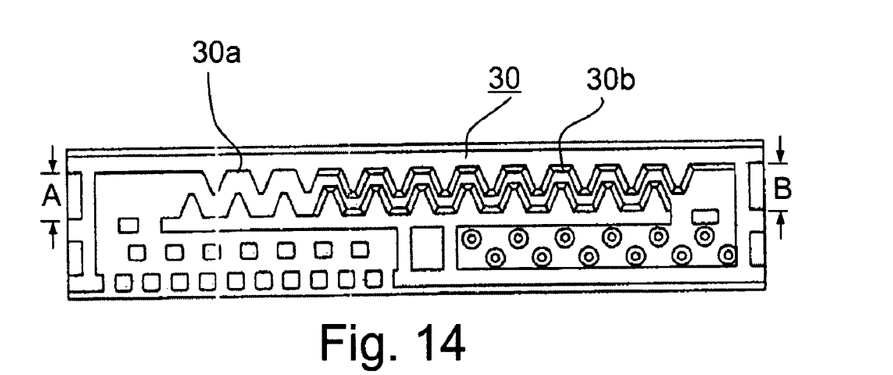
FIGS. 14-16 illustrate three further variations in the construction of the flow-control element of FIG. 4.

The Embodiment of FIG. 14

FIG. 14 illustrates a flow-control element having a labyrinth, generally designated 30, of basically the same construction as labyrinth 10 described above with respect to FIGS. 1-10, except that in this embodiment, the transverse dimension (width) of the labyrinth 30 remains the same for its complete length; i.e., A=B.

In all other respects, labyrinth 30 illustrated in FIG. 14 is constructed and operates in the same manner as described above with to FIGS. 1-10.

Figure 15:
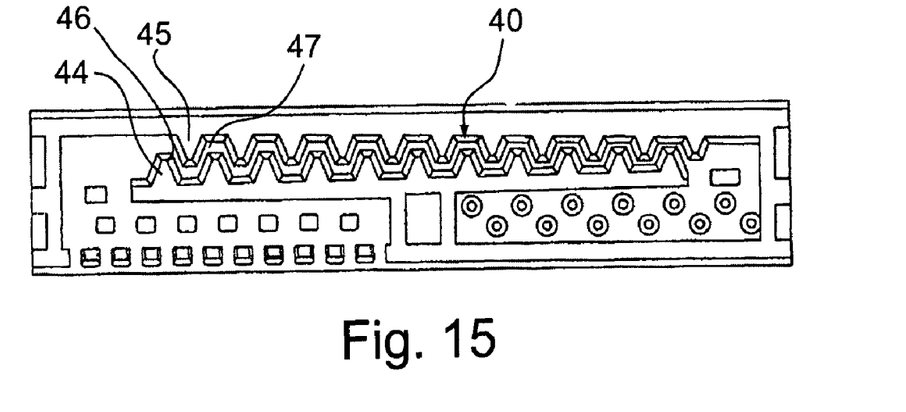

The Embodiment of FIG. 15

FIG. 15 illustrates a flow-control element including a labyrinth 40 which is similar to that of labyrinth 10 illustrated in FIGS. 1-10, except that the labyrinth includes only the pressure-sensitive section, corresponding to section 10b, FIGS. 1-10; that is, in labyrinth 40 all the teeth 44, 45 are formed with the expanded roots 46, 47, corresponding to the teeth in this outlet end 10b of labyrinth 10 in FIG. 1-10.

In all other respects, labyrinth 40 illustrated in FIG. 15 is constructed and operates in the same manner as described above with respect to FIGS. 1-10.

Figure 16:
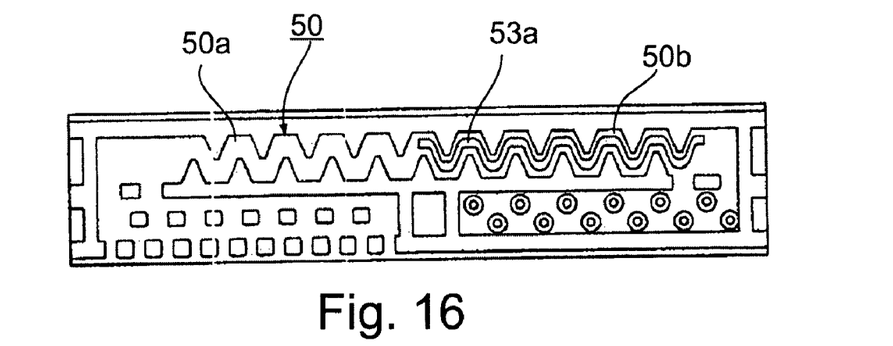
Figures 17, 18:
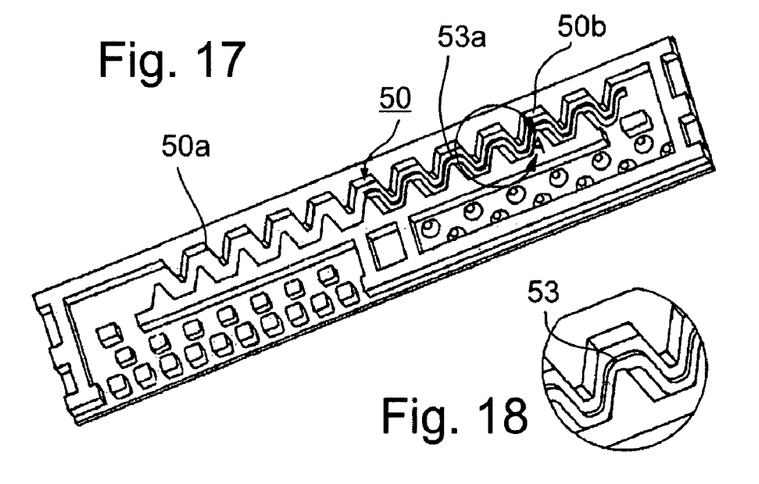
FIG. 17 is an isometric view of the flow-control element of FIG. 16.
FIG. 18 is an enlarged fragmentary view of the encircled region in FIG. 17.

The Embodiment of FIGS. 16-18

FIGS. 16-18 illustrate a flow-control element including another labyrinth 50 of basically the same construction as labyrinth 30 in FIG. 14, except that a groove 53a is formed in the bottom wall of the outlet section 50b of labyrinth 50. The provision of such a groove increases the laminar flow through that section, and further decreases the possibility of clogging even under high-pressure conditions. Such a groove is preferably provided in a labyrinth having expanded roots either in the outlet section of the labyrinth, of in the complete labyrinth, as described above, but in some cases it may be provided in a labyrinth having teeth not formed with the expanded roots.

Figures 19, 20:
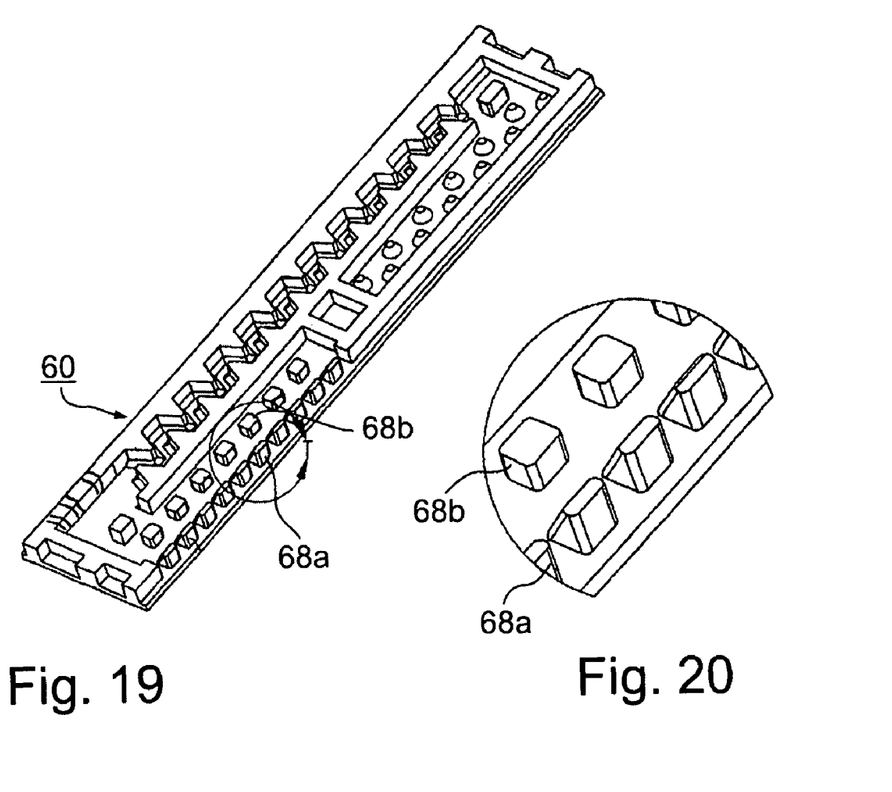
FIG. 19 illustrates a further variation, particularly in the inlet end of the flow-control element.
FIG. 20 is an enlarged fragmentary view of the encircled region in FIG. 19.
Figures 21, 23, 24:
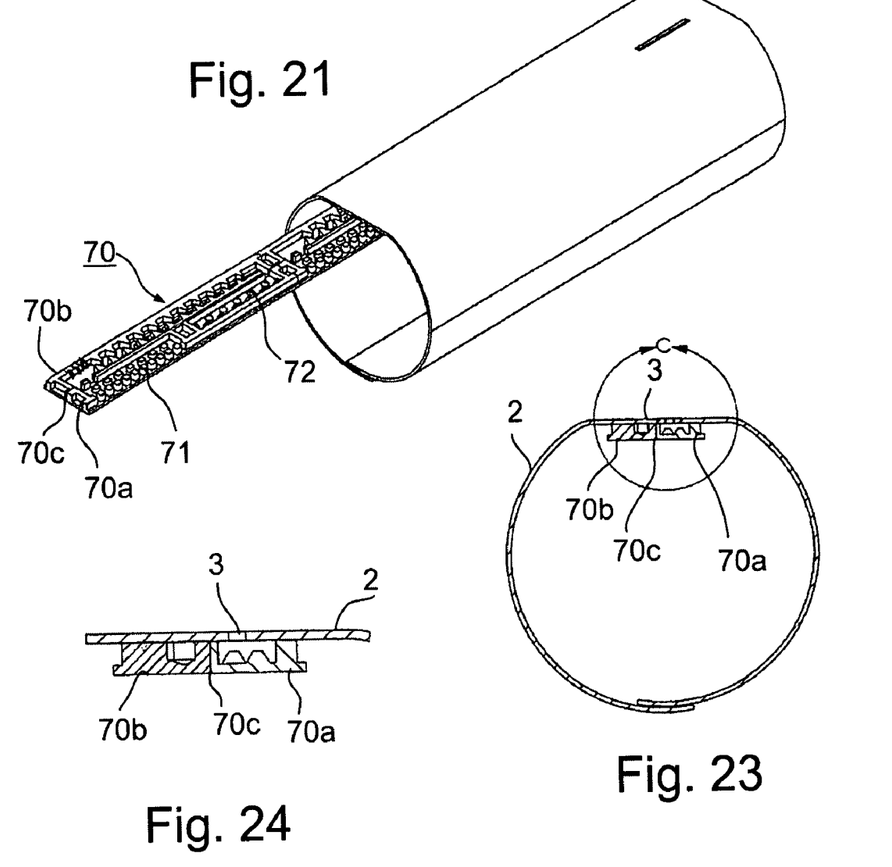
FIG. 21 illustrates a still further flow-control element constructed in accordance with the invention to include both an elastomeric section and a non-elastomeric section.
FIG. 23 is a sectional view of FIG. 21.
FIG. 24 is an enlarged fragmentary view of the encircled region of FIG. 23
Figure 22:
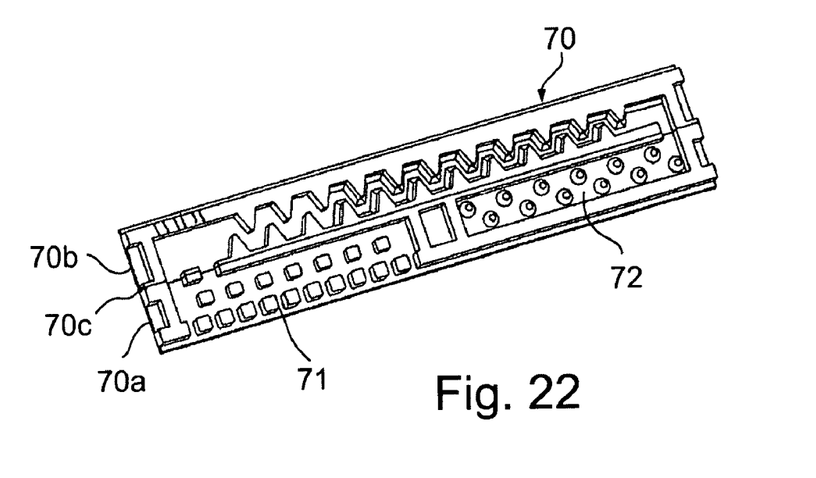
FIG. 22 illustrates the flow-control element of FIG. 21.

The Embodiment of FIGS. 19 and 20

FIGS. 19 and 20 illustrate a flow-control element including a labyrinth, therein generally designated 60, which is basically of the same construction as flow-control element including labyrinth 10 illustrated in FIGS. 1-10, except that the construction of the inlet 61 is slightly modified. Thus, inlet 61 to labyrinth 60 also includes a plurality of spaced projections arrayed in an outer line 68a and an inner line 68b, in which the height of those in the inner line 68b is slightly less than that those in the outer line 68a. In this case, however, the spaced projections in the outer line 68a are of decreasing thickness with increasing height. This feature further reduces the possibility of clogging the inlet even at high tube pressure, and further increases the chances of releasing clogging particles when the pressure drops. The outlet 62 is constructed as described above with an outer line 69a and a staggered inner line 69b of spaced projections.

The Embodiment of FIGS. 21-24

In all the previously-described embodiments, the flow-control elements 6 (FIG. 1) are in the form of a continuous strip 5 of an elastomeric material. FIGS. 21-24 illustrate a construction wherein the flow-control element, therein generally designated 70, is in the form of a continuous strip which includes a non-elastic material section 70a having the inlet 71 and outlet 72, and an elastomeric material section 70b bonded to the non-elastomeric material section 70a along bond lines 70c and defining the labyrinth of the respective flow-control element. For example, the non-elastomeric material section 70a may be of polyethylene, and the elastomeric material section 70b may be any one of the known elastomers used in drip-irrigation hoses of this general type.

It will be appreciated that in this embodiment, as well as in the previously-described embodiments, the flow-control elements can be produced and applied as separate discrete elements rather than in a continuous strip.

While the invention has been described with respect to several preferred embodiments, it will be appreciated that these are set forth merely for purposes of example, and that many other variations, modifications and applications of the invention may be made.

What is claimed is:

1. A drip irrigation hose, comprising:
a tube for conducting pressurized water through its interior and formed with a plurality of outlets for emitting water at longitudinally-spaced locations along the length of the tube;
and a plurality of flow-control elements fixed with respect to the inner surface of said tube at longitudinally-spaced locations thereof to define, with said inner surface, a plurality of labyrinths each having an inlet communicating with the interior of the tube and an outlet communicating with a tube outlet for emitting water there from at a slow rate;
said labyrinth including a bottom wall of an elastomeric material constructed to produce, adjacent to said bottom wall, a significant laminar flow of water in which the laminar flow decreases, and thereby turbulent flow increases, with an increase in the water pressure within the tube to thereby provide pressure-compensation for the water flow through the respective tube outlet;
wherein said labyrinth further includes a plurality of teeth in spaced, staggered relationship to each other; at least some of said teeth being constructed with an expanded root where joined to the bottom wall to produce significant laminar flow adjacent to said bottom wall; said bottom wall being dimensioned such that an increase in said water pressure deforms the bottom wall in a manner to decrease the laminar flow through said labyrinth and thereby to increase the pressure drop through the respective portion of said labyrinth;
and wherein said teeth, including said expanded roots, are joined to said bottom wall by a juncture formed with a curve or an obtuse angle with respect to said bottom wall, such that said juncture tends to increase the laminar flow adjacent to the bottom wall, but said water pressure applied to said bottom wall tends to deform said juncture to decrease the laminar flow adjacent to said bottom wall, and thereby to increase the turbulent flow through said labyrinth.

2. The drip irrigation hose according to claim 1, wherein said teeth are formed at spaced locations in a pair of spaced side walls; and wherein the portions of each side wall between its respective teeth are also joined to said bottom wall by junctures formed with a curve or an obtuse angle with respect to said bottom wall.

3. The drip irrigation hose according to claim 1, wherein only said teeth at the outlet end of the labyrinth are joined to said bottom wall by said junctures formed with a curve or obtuse angle with respect to said bottom wall.

4. The drip irrigation hose according to claim 1, wherein the angle defined by said junctures and the bottom wall is substantially the same for the respective length of the labyrinth.

5. The drip irrigation hose according to claim 1, wherein the angle defined by said junctures and the bottom wall increases in the downstream direction of said labyrinth.

6. The drip irrigation hose according to claim 1, wherein the angle defined by said junctures and the bottom wall is within the range of 100-130°.

7. The drip irrigation hose according to claim 1, wherein at least the portion of said labyrinth at its outlet end has a transverse dimension which decreases in width in the downstream direction.

8. The drip irrigation hose according to claim 1, wherein the complete labyrinth has a transverse dimension which decreases in width in the downstream direction.

9. The drip irrigation hose according to claim 8, wherein the labyrinth has a transverse width of 2.5-1.5 mm at its inlet end, and 2.0-1.0 mm at its outlet end.

10. The drip irrigation hose according to claim 8, wherein the labyrinth has a transverse width of 2.0 mm at its inlet end, and 1.5 mm at its outlet end.

11. The drip irrigation hose according to claim 1, wherein said bottom wall in at least the portion of said labyrinth at its outlet end, is formed with a continuous groove increasing the laminar flow through the respective portion of said labyrinth.

12. The drip irrigation hose according to claim 1, wherein said plurality of flow-control elements are in the form of a continuous strip secured to said inner face of the tube.

13. The drip irrigation hose according to claim 12, wherein said continuous strip is of an elastomeric material.

14. The drip irrigation hose according to claim 12, where said continuous strip includes a strip of a nonelastomeric material and a strip of an elastomeric material bonded thereto and defining said labyrinth with the inner surface of the tube.

15. The drip irrigation hose according to claim 14, wherein said strip of an elastomeric material is also formed with said outlets of the labyrinth.

16. The drip irrigation hose according to claim 1, wherein the outlet of each labyrinth is defined by a plurality of spaced projections engageable with the inner surface of the tube to form outlet passageways for the water exiting from the respective labyrinth; and wherein said plurality of spaced projections are of conical configuration and are arrayed as an outer line, and as inner line in a staggered relationship with respect to those of the outer line.

17. The drip irrigation hose according to claim 1, wherein the inlet of each labyrinth is defined by a plurality of spaced projections engageable with the inner surface of the tube to form a plurality of filtering inlet passageways for the water entering the respective labyrinth from the interior of the tube; and wherein said plurality of spaced projections are arrayed as an outer line, and as an inner line in a staggered relationship with respect to those of the outer line.

18. The drip irrigation hose according to claim 17, wherein the spaced projections in said inner line are of shorter height than those in the outer line.

19. The drip irrigation hose according to claim 17, wherein the spaced projections in said outer line are of decreasing thickness with increasing height.

20. A drip irrigation hose, comprising:
a tube for conducting pressurized water through its interior and formed with a plurality of outlets for emitting water at longitudinally-spaced locations along the length of the tube;
and a plurality of flow-control elements fixed with respect to the inner surface of said tube at longitudinally-spaced locations thereof to define, with said inner surface, a plurality of labyrinths each having an inlet communicating with the interior of the tube and an outlet communicating with a tube outlet for emitting water there from at a slow rate;
said labyrinth including a bottom wall of an elastomeric material constructed such that the turbulent flow through the labyrinth is gradually changed along the length of the labyrinth by changes in the water pressure within the tube;
wherein said labyrinth further includes a plurality of teeth in spaced, staggered relationship to each other; at least some of said teeth being constructed with an expanded root where joined to the bottom wall to produce significant laminar flow adjacent to said bottom wall; said bottom wall being dimensioned such that an increase in said water pressure deforms the bottom wall in a manner to decrease the laminar flow through said labyrinth and thereby to increase the pressure drop through the respective portion of said labyrinth;
and wherein said teeth, including said expanded roots, are joined to said bottom wall by a juncture formed with a curve or an obtuse angle with respect to said bottom wall, such that said juncture tends to increase the laminar flow adjacent to the bottom wall, but said water pressure applied to said bottom wall tends to deform said juncture to decrease the laminar flow adjacent to said bottom wall, and thereby to increase the turbulent flow through said labyrinth.

21. The drip irrigation hose according to claim 20, wherein said teeth are formed at spaced locations in a pair of spaced side walls; and wherein the portions of each side wall between its respective teeth are also joined to said bottom wall by junctures formed with a curve or an obtuse angle with respect to said bottom wall.

22. The drip irrigation hose according to claim 20, wherein at least the portion of said labyrinth at its outlet end has a transverse dimension which decreases in width in the downstream direction.

23. A drip irrigation hose, comprising:
a tube for conducting pressurized water through its interior and formed with a plurality of outlets for emitting water at longitudinally-spaced locations along the length of the tube;
and a plurality of flow-control elements fixed with respect to the inner surface of said tube at longitudinally-spaced locations thereof to define, a plurality of labyrinths each having an inlet communicating with the interior of the tube and an outlet communicating with a tube outlet for emitting water there from at a slow rate;
said labyrinth, being of an elastomeric material and including a bottom wall and teeth having, adjacent to said bottom wall, expanded roots whose shape changes with an increase in pressure within the tube to increase turbulent flow through said labyrinth;
wherein said teeth, including said expanded roots, are joined to said bottom wall by a juncture formed with a curve or an obtuse angle with respect to said bottom wall, such that said juncture tends to increase the laminar flow adjacent to the bottom wall, but said water pressure applied to said bottom wall tends to deform said juncture to decrease the laminar flow adjacent to said bottom wall, and thereby to increase the turbulent flow through said labyrinth.

24. The drip irrigation hose according to claim 23, wherein said teeth are formed at spaced locations in a pair of spaced side walls; and wherein the portions of each side wall between its respective teeth are also joined to said bottom wall by junctures formed with a curve or an obtuse angle with respect to said bottom wall.

25. The drip irrigation hose according to claim 23, wherein at least the portion of said labyrinth at its outlet end has a transverse dimension which decreases in width in the downstream direction.

26. A drip irrigation hose, comprising:
a tube for conducting pressurized water through its interior and formed with a plurality of outlets for emitting water at longitudinally-spaced locations along the length of the tube;
and a plurality of flow-control elements fixed with respect to the inner surface of said tube at longitudinally-spaced locations thereof to define, with said inner surface, a plurality of labyrinths each having an inlet communicating with the interior of the tube and an outlet communicating with a tube outlet for emitting water there from at a slow rate;
said labyrinth including a bottom wall of an elastomeric material and constructed such that its deformability to the water pressure within the tube decreases in the downstream direction;
wherein said labyrinth further includes a plurality of teeth in spaced, staggered relationship to each other; at least some of said teeth being constructed with an expanded root where joined to the bottom wall to produce significant laminar flow adjacent to said bottom wall; said bottom wall being dimensioned such that an increase in said water pressure deforms the bottom wall in a manner to decrease the laminar flow through said labyrinth and thereby to increase the pressure drop through the respective portion of said labyrinth;
and wherein said teeth, including said expanded roots, are joined to said bottom wall by a juncture formed with a curve or an obtuse angle with respect to said bottom wall, such that said juncture tends to increase the laminar flow adjacent to the bottom wall, but said water pressure applied to said bottom wall tends to deform said juncture to decrease the laminar flow adjacent to said bottom wall, and thereby to increase the turbulent flow through said labyrinth.

27. The drip irrigation hose according to claim 26, wherein said teeth are formed at spaced locations in a pair of spaced side walls; and wherein the portions of each side wall between its respective teeth are also joined to said bottom wall by junctures formed with a curve or an obtuse angle with respect to said bottom wall.

28. The drip irrigation hose according to claim 26, wherein at least the portion of said labyrinth at its outlet end has a transverse dimension which decreases in width in the downstream direction.

29. The drip irrigation hose according to claim 26, wherein the complete labyrinth has a transverse dimension which decreases in width in the downstream direction.

30. A flow-control element constructed to be fixed with respect to the inner surface of a tube comprising:
a plastic strip shaped to define, with the inner surface of the tube, a labyrinth having an inlet communicating with the interior of the tube and an outlet downstream of the inlet communicating with a tube outlet for emitting water there from at a slow rate;
said labyrinth including a bottom wall of an elastomeric material, and constructed to produce, adjacent to said bottom wall, a significant laminar flow of water in which the laminar flow decreases, and thereby turbulent flow increases, with an increase in the water pressure within the tube to thereby provide pressure-compensation for the water flow through the respective tube outlet;
wherein said labyrinth further includes a plurality of teeth in spaced, staggered relationship to each other; at least some of said teeth being constructed with an expanded root where joined to the bottom wall to produce significant laminar flow adjacent to said bottom wall; said bottom wall being dimensioned such that an increase in said water pressure deforms the bottom wall in a manner to decreases the laminar flow through said labyrinth and thereby to increase the pressure drop through the respective portion of said labyrinth;
and wherein said teeth, including said expanded roots, are joined to said bottom wall by a juncture formed with a curve or an obtuse angle with respect to said bottom wall, such that said juncture tends to increase the laminar flow adjacent to the bottom wall, but said water pressure applied to said bottom wall tends to deform said juncture to decrease the laminar flow adjacent to said bottom wall, and thereby to increase the turbulent flow through said pressure-reducing passageway.

31. The flow-control element according to claim 30, wherein said teeth are formed at spaced locations in a pair of spaced side walls; and wherein the portions of each side wall between its respective teeth are also joined to said bottom wall by junctures formed with a curve or an obtuse angle with respect to said bottom wall.

32. The flow-control element according to claim 30, wherein only said teeth at the outlet end of the labyrinth are joined to said bottom wall by said junctures formed with a curve or obtuse angle with respect to said bottom wall.

33. The flow-control element according to claim 30, wherein the angle defined by said junctures and the bottom wall is substantially the same for the respective length of the labyrinth.

34. The flow-control element according to claim 30, wherein the angle defined by said junctures and the bottom wall increases in the downstream direction of said labyrinth.

35. The flow-control element according to claim 30, wherein the angle defined by said junctures and the bottom wall is within the range of 100-130°.

36. The flow-control element according to claim 30, wherein at least the portion of said labyrinth at its outlet end has a transverse dimension which decreases in width in the downstream direction.

37. The flow-control element according to claim 30, wherein said complete labyrinth has a transverse dimension which decreases in width in the downstream direction.

38. The flow-control element according to claim 37, wherein the labyrinth has a transverse width of 2.5-1.5 mm at its inlet end, and 2.0-1.0 mm at its outlet end.

39. The flow-control element according to claim 37, wherein the labyrinth has a transverse width of 2.0 mm at its inlet end, and 1.5 mm at its outlet end.

40. The flow-control element according to claim 30, wherein said bottom wall, in at least the portion of said labyrinth at its outlet end, is formed with a continuous groove increasing the laminar flow through the respective portion of labyrinth.

41. The flow-control element according to claim 30, wherein said plurality of flow-control elements are in the form of a continuous strip to be fixed to said inner face of the tube.

42. The flow-control element according to claim 30, wherein said continuous strip is of an elastomeric material.

43. The flow-control element according to claim 30, where said continuous strip includes a strip of a nonelastomeric material and a strip of an elastomeric material bonded thereto and defining said labyrinth with the inner surface of the tube.

44. The flow-control element according to claim 43, wherein said strip of nonelastomeric material is also formed with said outlets of the labyrinths.

* * * * *